United States Patent [19]

Schultz

[11] Patent Number: 5,721,665
[45] Date of Patent: Feb. 24, 1998

[54] MODULATED MAGNET FIELD BULK DEGAUSSING SYSTEM

[75] Inventor: Robert A. Schultz, Chicago, Ill.

[73] Assignee: Data Security, Inc., Lincoln, Nebr.

[21] Appl. No.: 516,723

[22] Filed: Aug. 18, 1995

[51] Int. Cl.$^6$ ............................................. H01F 13/00
[52] U.S. Cl. ........................... 361/149; 361/267; 361/151
[58] Field of Search ................................ 361/149–151, 361/267

[56] References Cited

U.S. PATENT DOCUMENTS

| | | |
|---|---|---|
| 2,481,392 | 9/1949 | Camras. |
| 2,766,328 | 10/1956 | Handschin et al.. |
| 3,023,280 | 2/1962 | Tronslin et al.. |
| 3,143,689 | 8/1964 | Hall. |
| 3,329,872 | 7/1967 | Amos. |
| 3,895,270 | 7/1975 | Maddox ............................ 361/149 |
| 3,938,011 | 2/1976 | Littwin. |
| 4,136,373 | 1/1979 | Amos. |
| 4,146,956 | 4/1979 | Fujiwara. |
| 4,180,835 | 12/1979 | Okumura et al.. |
| 4,187,521 | 2/1980 | Rotter et al.. |
| 4,346,426 | 8/1982 | Baumann et al. ................. 361/151 |
| 4,423,460 | 12/1983 | Jackson et al.. |
| 4,462,055 | 7/1984 | Jackson et al.. |
| 4,462,059 | 7/1984 | Yamagami et al. ................ 361/267 |
| 4,467,389 | 8/1984 | Knipp ................................ 361/151 |
| 4,471,403 | 9/1984 | Dress, Jr. et al. ................. 361/267 |
| 4,639,821 | 1/1987 | Littwin et al.. |
| 4,730,230 | 3/1988 | Helfrick ............................. 361/151 |
| 4,751,608 | 6/1988 | Schultz. |
| 4,897,759 | 1/1990 | Becker. |
| 5,204,801 | 4/1993 | Becker et al.. |
| 5,270,899 | 12/1993 | Saito ................................. 361/151 |
| 5,416,664 | 5/1995 | Becker et al.. |

FOREIGN PATENT DOCUMENTS

2108259  8/1972  Germany.

*Primary Examiner*—Fritz Fleming
*Attorney, Agent, or Firm*—Fitch, Even, Tabin & Flannery

[57] ABSTRACT

A bulk degaussing system for bulk erasure of various magnetic media includes a source of magnetic flux for generating a magnetic field with a predetermined field strength within a predetermined volume defining a predetermined degaussing window, a transport system for transporting the magnetic media relative to the degaussing window such that every point on the magnetic media is exposed to the magnetic field. A control circuit is included which modulates the magnetic field to reduce power consumption. In addition to reducing power consumption, the modulated magnetic field minimizes system performance degradation due to stalls of the magnetic media transport system due to interactions between the magnetic field and ferromagnetic components associated with certain magnetic media.

2 Claims, 8 Drawing Sheets

MODULATED MAGNET FIELD BULK DEGAUSSING SYSTEM

BACKGROUND OF THE INVENTION

1. Field of the Invention

The present invention relates to a bulk degaussing system for bulk erasing of various magnetic media and more particularly to a bulk degaussing system which includes a source of magnetic flux for generating a predetermined magnetic field strength within a predetermined volume, defining a degaussing window; a transport system for transporting the magnetic media relative to the degaussing window; and control circuitry for modulating a magnetic field with respect to a degaussing window in order to reduce power consumption of the bulk degaussing system while ensuring adequate erasure of the magnetic media and allowing for automatic recovery of the media transport system from stalls due to interaction with the magnetic field in order to prevent media exposure degradation.

2. Description of the Prior Art

Bulk degaussing systems are generally known in the art. Examples of such bulk degaussing systems are disclosed in U.S. Pat. Nos. 3,023,280; 3,143,689; 3,938,011; and 5,204,801. Such bulk degaussing systems are used for bulk erasing of various magnetic media, such as tape reels, cassettes, cartridges and various computer memory storage devices, such as hard and floppy disks, whether within or removed from the disk drive; hereinafter collectively referred to as "magnetic media". Such magnetic media differ not only in size, but also in ease of erasure (i.e. magnetic coercivity). A common objective of such bulk degaussing systems is to accommodate a wide variety of such magnetic media.

There are various types of bulk degaussing systems known in the art. One known bulk degaussing system generates a magnetic field of a predetermined field strength within a volume that is relatively larger than the bulk volume of the magnetic media. In such a system, a single magnet is used to generate a single magnetic pulse having a volume generally greater than the bulk volume of the magnetic media. In such a configuration, the magnetic media is stationary during the application of the magnetic field.

There are various problems with such bulk degaussing systems. In particular, various magnetic media, such as magnetic tape, have a circular orientation for erasure, which makes it relatively difficult to align all of the points on the magnetic media with the magnetic field direction for any single magnet configuration. Additionally, the performance of such a bulk degaussing system is limited. More particularly, erasure performance is known to be enhanced by exposing every point on the magnetic media to a magnetic field in a variety of directions. With a configuration having a single magnet and stationery magnetic media, such exposure is not possible.

In yet other known bulk degaussing systems, such as disclosed in U.S. Pat. No. 3,143,689, a series of magnetic pulses, either unipolar or decaying, are generated by a plurality of magnet windings, energized in sequence and configured to provide differing magnetic field directions having a predetermined field strength within a volume generally greater than the bulk volume of the magnetic media. Although such systems provide better performance than single magnet systems, such systems generally utilize relatively large magnets and/or a plurality of magnetic windings, which add to the size, weight and complexity of the bulk degaussing unit.

In other known systems, such as disclosed in U.S. Pat. Nos. 3,023,280; 3,938,011; and 5,204,801, a magnetic field of a predetermined magnetic field strength is generated in a degaussing window having a volume that is either equal to or smaller than a cross-section of the magnetic media. In such systems, the magnetic field is continuously generated while magnetic media is transported through the degaussing window to expose the entire volume of the magnetic media to the magnetic field within the degaussing window.

While such systems generally utilize a relatively small magnet, such systems have other disadvantages. For example, due to the continuous magnet operation, such systems generally consume a relatively large amount of energy which not only makes the system energy inefficient, but can cause thermal problems in the system. In addition, due to the generation of a constant magnetic field, such systems can cause stalling of the magnetic media transport system due to interactions between the magnetic field and ferro-magnetic components associated with certain known magnetic media, which can prevent complete exposure of the entire magnetic media and thus seriously degrade performance of the system.

SUMMARY OF THE INVENTION

It is an object of the present invention to provide a bulk degaussing system which solves various problems in the prior art.

It is yet another object of the present invention to provide a bulk degaussing system that is relatively energy efficient relative to known bulk degaussing systems.

It is yet another object of the present invention to provide a bulk degaussing system which virtually eliminates degradation in system performance due to stalling of the magnetic media transport system due to interaction with the magnetic field.

Briefly, the present invention relates to a bulk degaussing system for bulk erasure of various magnetic media which includes a source of magnetic flux for generating a magnetic field with a predetermined field strength within a predetermined volume defining a predetermined degaussing window and a transport system for transporting the magnetic media relative to the degaussing window such that every point on the magnetic media is exposed to the magnetic field. A control circuit is included which modulates the magnetic field to reduce power consumption. In addition to reducing power consumption, the modulated magnetic field minimizes system performance degradation due to stalls of the magnetic media transport system due to interaction with the magnetic field.

BRIEF DESCRIPTION OF THE DRAWING

These and other objects of the present invention will be readily understood with reference to the following specification and attached drawing, wherein.

DETAILED DESCRIPTION OF THE INVENTION

The present invention includes a source of magnetic flux, generally identified with the reference numeral 20 (FIG. 1), a transport system 22 (FIG. 2) and a control circuit 24 (FIGS. 6A, 6B, 8, 9) for modulating the magnetic field generated by the source of magnetic flux 20 in order to reduce power consumption of the bulk degaussing system while ensuring adequate erasure of the magnetic media. An important aspect of the invention is that it provides for automatic recovery of the transport system 22 from stalls due to interaction with the magnetic field, which, in turn, prevents media exposure degradation.

Figure 1:
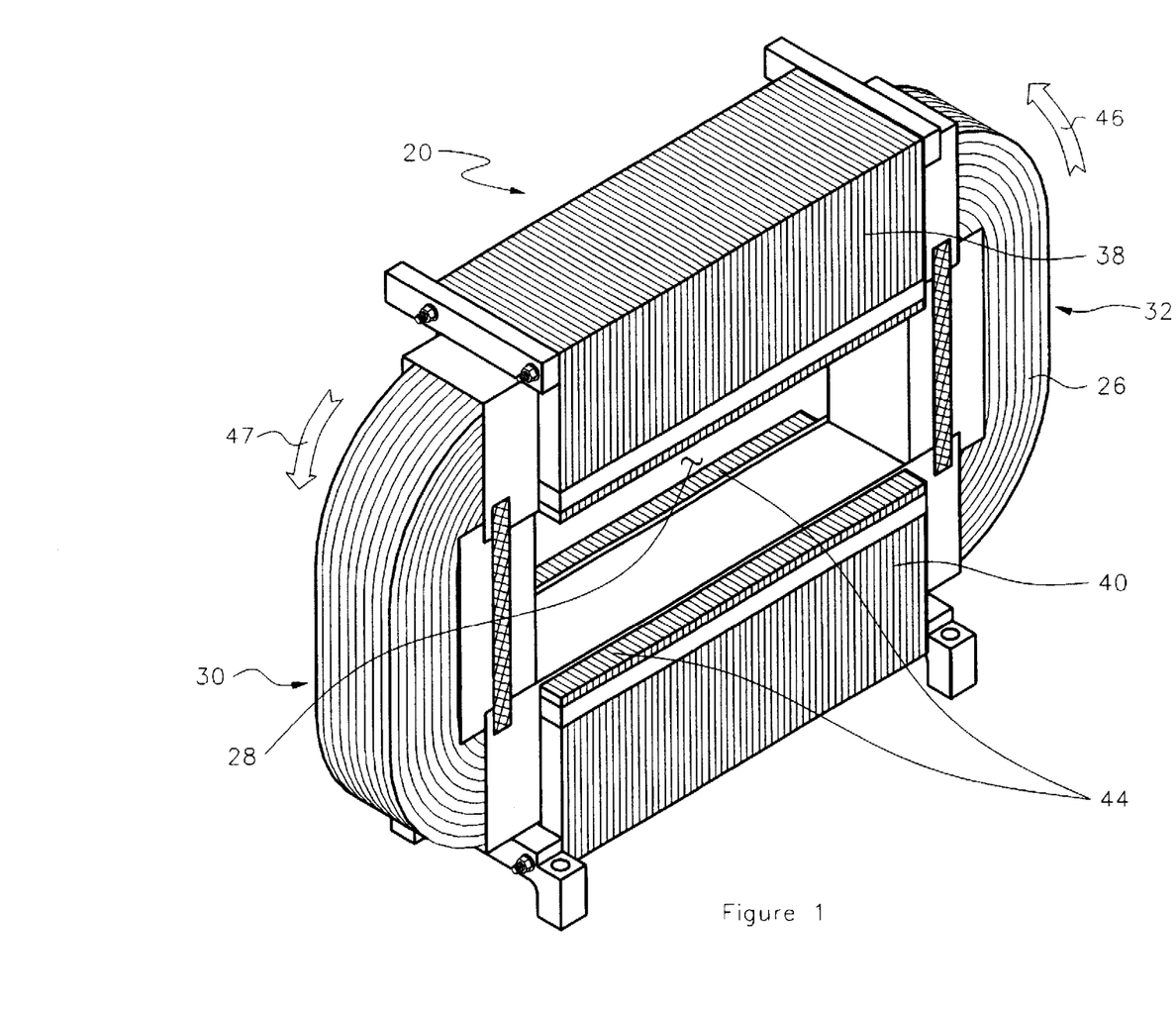
FIG. 1 is a perspective view of a source of magnetic flux for use in the bulk degaussing system in accordance with the present invention.
Figure 2:
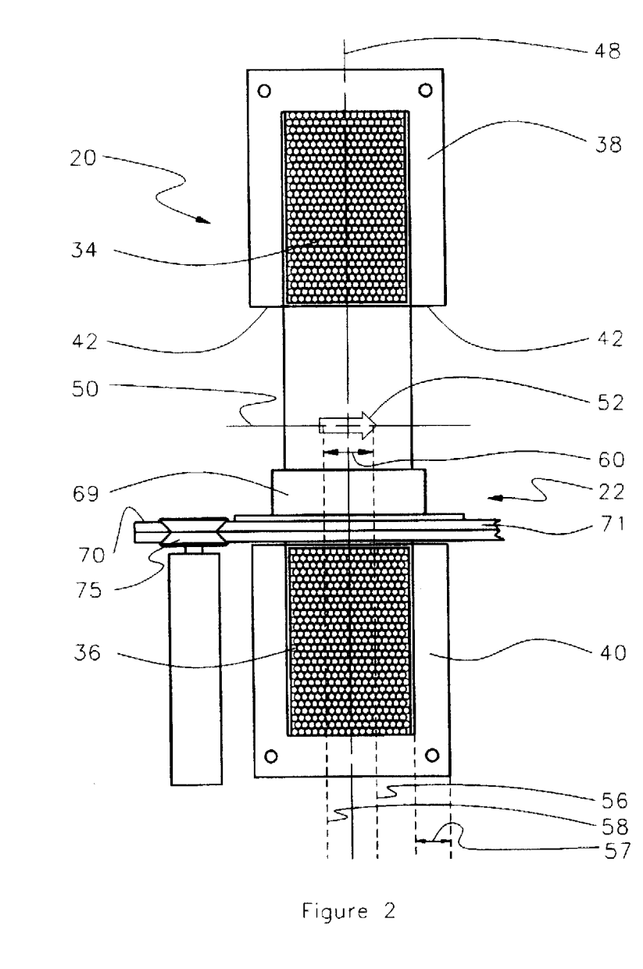
FIG. 2 is a sectional view of the magnetic flux source illustrated in FIG. 1.

The source of magnetic flux is best shown in FIGS. 1 and 2. Although various configurations for the source of magnetic flux 20 fall within the principles of the present invention, only a single configuration is illustrated in FIGS. 1 and 2 for simplicity. Referring to FIGS. 1 and 2, the source of magnetic flux 20 includes a wound coil of electrical wire 26. The coil 26 may be wound around a generally rectangular coil form (not shown) resulting in a generally rectangular window 28 defining two generally U-shaped curved ends 30 and 32 (FIG. 2) and two elongated horizontal segments 34 and 36 (FIG. 3), connected together forming a generally rectangular shape with the rectangular window 28 centrally disposed. The size of the coil wire and number of turns is selected as a function of the magnetic coercivity of the magnetic media to be erased; clearly within the ordinary skill in the art.

Two generally U-shaped laminated iron cores 38 and 40 (FIGS. 1 and 2) are clad over the elongated horizontal segments 34 and 36 of the coil 26 to form an electromagnet with opposing magnetic poles. More particularly, each of the iron cores 38 and 40 include a pair of extending ends 42 and 44 (FIGS. 2 and 1), respectively. These extending ends 42 and 44 form magnetic poles, which generate magnetic flux of a predetermined field strength within a predetermined volume defining a degaussing window.

Various embodiments of the source of magnetic flux 20 are contemplated within the scope of the invention. For example, the degaussing window may be selected as 2.85 inches by 14.75 inches to accommodate various magnetic media 64, such as, 2-inch by 14-inch NAB reels, cassette sizes through medium D1/D2, and "half-height" hard disk drives having 5¼ inch disks with an 11-inch diagonal housing.

The upper and lower cores 38 and 40 may be formed from 14½ inch stacks of Temple Steel Co. E-8 laminations with the center leg of the "E" removed. The coil form (not shown) for the source of magnetic flux 20 may be formed from 0.07 inch thick epoxy glass channels with 1.00 inch thick end spacers and 0.005 inch thick NOMEX supplements for the sides and to line the open ends of the channels. The coil 26 may be formed from 13 AWG wire with 1277 turns including a tap for operation in the circuit shown in FIG. 10, with that part of the coil connected between AC resonant capacitance 194 and current shunt resistor 190 comprised of 1235 turns yielding resistance of approximately 10 Ohms and inductance of approximately 1.5 Henries. With a 240 VAC power source 186 and 4.7 microfarads of resonant capacitance 194, the AC operating mode illustrated in FIG. 10B induces approximately 5600 VAC across the resonant capacitance 194, yielding a strong magnetic potential, 12,250 Ampere turns, while conducting only about 15 Amperes from the AC power source 186.

Referring to FIG. 1, electrical current directed in the coil 26 in the direction as indicated by the arrows 46 and 47 will induce magnetic flux according to the so-called "right-hand rule" between the magnetic poles 42 and 44. Since the direction of electrical current flow reverses from the iron core 38 relative to the iron core 40, the magnetic flux will be additive relative to a horizontal center plane 50 to produce a net magnetic flux relative to the horizontal center plane 50 in the direction indicated by the arrow 52 (FIG. 2).

With a configuration for the source of magnetic flux 20, as generally illustrated in FIGS. 1 and 2 and described above, the worst case performance for the bulk degaussing system will occur along the horizontal center plane 50, since the magnetic field strength decreases as the distance from the poles 42 and 44 is increased. Also, the effective degaussing window widens away from the horizontal center plane 50. Moreover, since the direction of magnetic flux density in the horizontal center plane 50 is purely horizontal, any point of magnetic media passing through the horizontal center plane 50 will be exposed to minimum magnetic strength for a minimum amount of time and is not exposed to any vertical components of the magnetic field. As such, the description of the invention is limited to performance along the horizontal center plane 50 as a worst case and assumes an improved performance both above and below the horizontal center plane 50 to assure complete erasure for various types of bulk magnetic media.

Figure 3:
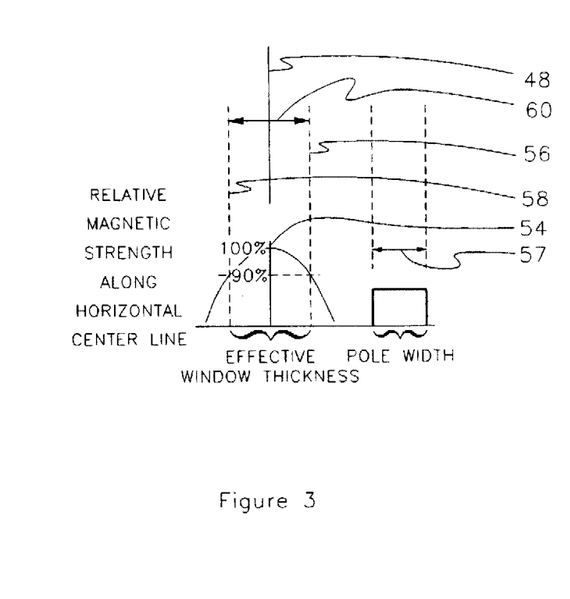
FIG. 3 is a graphical illustration of the field strength of the magnetic flux source illustrated in FIG. 1 along a plane perpendicular to the degaussing window.
Figure 4:
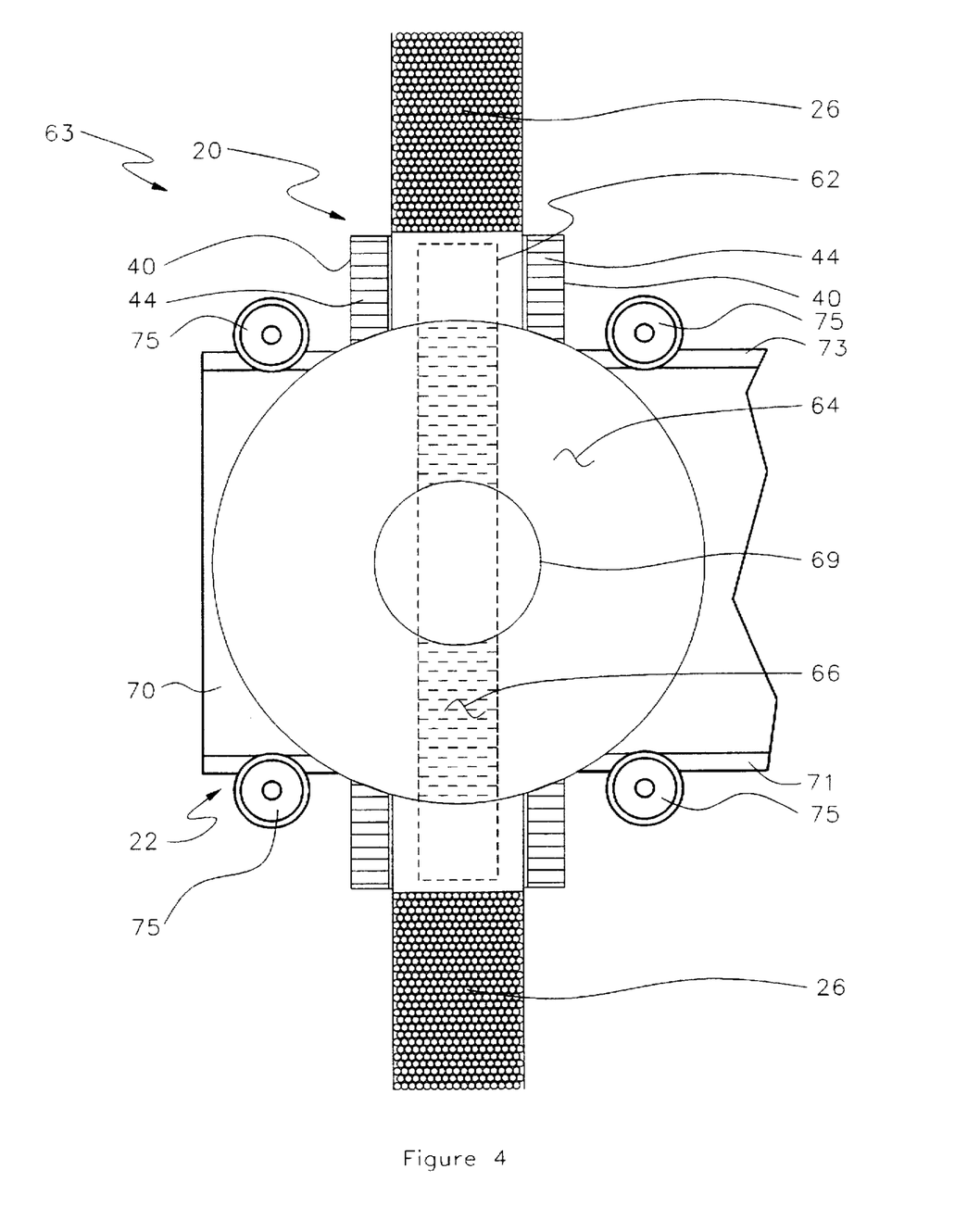
FIG. 4 is a horizontal cross-sectional view of the bulk degaussing system in accordance with the present invention in FIG. 1, shown with magnetic media.

Referring to FIG. 3, a graphical illustration of the magnetic field strength along the horizontal center plane 50 is illustrated and mapped onto FIG. 2. As shown, a point 54 at the vertical center plane 48 represents maximum magnetic field strength of 100%. Although the magnetic field strength has a peak strength along the vertical center plane 48, a thickness can be assigned to a degaussing window if the strength needed for a particular application is less than peak strength. Thus, vertical lines 56 and 58, equally spaced relative to the vertical center plane 48, represent locations of equal field strength, for example, 90% of the peak field strength. By projecting the vertical lines 56 and 58 onto FIG. 2, a degaussing window thickness 60 along the horizontal center plane 50 is defined. By extending the window thickness 60 in the horizontal center plane 50 to the opposing ends of the rectangular window 28 within the coil 26, a degaussing window 62, as best illustrated in FIG. 4, is defined. As mentioned above, the magnetic field strength along the vertical center plane 48 of the degaussing window 62 is at 100% while the boundaries (i.e. vertical lines 56 and 58 (FIG. 3)) define a predetermined minimal magnetic field strength, such as 90%. The degaussing window 62 enables the use of both AC and DC current, assuming that the degaussing window thickness 60 is sized to account for delays and motion effects.

Figures 5A, 5B, 5C:
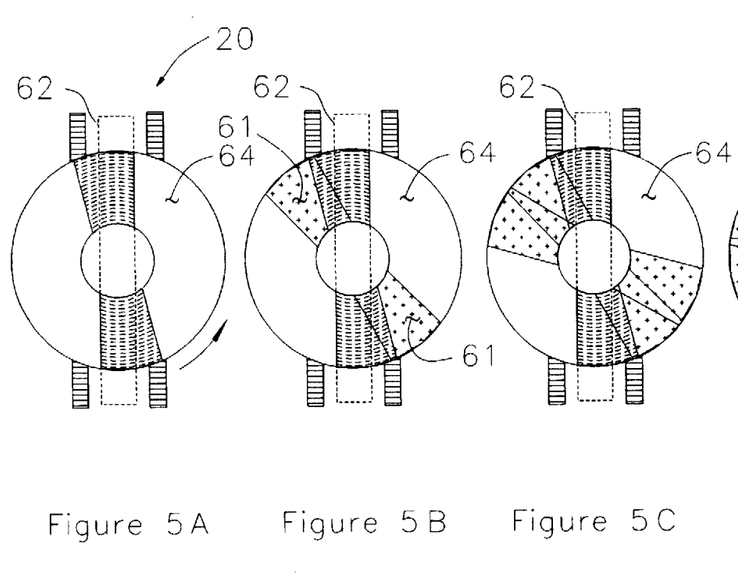
FIGS. 5A–5E are similar to FIG. 4, shown with the magnetic media in various stages of rotation.
Figures 5D, 5E:
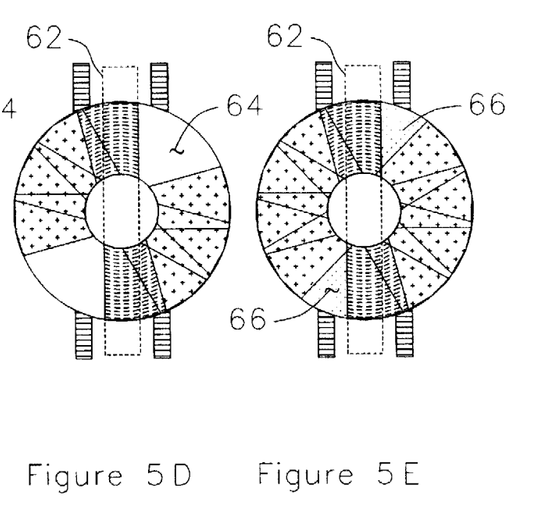

FIG. 4 illustrates a bulk degaussing system 63 in accordance with the present invention, shown with magnetic media 64 disposed therewithin at a single instant in time. For magnetic media, such as the magnetic disk or tape reel 64 shown, the dashed region 66 illustrates that portion of the magnetic media 64 that is exposed to the degaussing window 62 at a given point in time when the source of magnetic flux 20 is in an energized state. FIGS. 5A–5E illustrate successive regions of the magnetic media 64 that are transported through the degaussing window 62 by the transport system 22. Assuming a 50% ON/OFF modulation period (i.e. 50% duty cycle), the angular rotational speed of the magnetic media 64 is selected such that the circumference of the magnetic media 64 moves relatively less than the effective thickness 60 of the degaussing window 62 during each ON period and an equal distance during each OFF period. With such a configuration, the successive degaussing window exposure, illustrated in FIGS. 5A–5E, will include some overlap for compensation for motion and delay effects. As shown in FIG. 5E, all of the various regions of the magnetic media 64 will be exposed to the degaussing window 62 after five modulation cycles except for those regions identified with the reference numeral 66. These regions 66 will be exposed during a sixth modulation cycle to complete the bulk degaussing of the magnetic media 64.

Since the source of magnetic flux 20 is only operating about 50% of the time in the configuration as discussed above, the energy savings approach about 50%. However, it may be desirable to compensate for the thickness 60 of the degaussing window 62 to compensate for media motion or electrical delay effects which may require an increase of the magnetic field strength of the source of magnetic flux 20 or to operate the system a duty cycle greater than 50%. In such situations the energy savings would be somewhat less for the situation discussed above. Alternatively, the source of magnetic flux could be configured to permit a duty cycle of much less than 50%, in which case much greater energy savings would be achieved. More particularly, in situations where motion and delay effects are negligible, the source of magnetic flux 20 could be configured to generate a magnetic field within the degaussing window 62 for a relatively brief instant, which would allow the energy savings to theoretically approach 100%. Moreover, the inductive energy within the system during ON periods could be stored during OFF periods, which would provide even more proficiency.

In order to effectively erase the magnetic media 64 while providing the energy savings discussed above, consecutive ON periods of the source of magnetic flux 20 need not expose adjacent or overlapping regions of the magnetic media 64. The modulation of the source of magnetic flux 20 would simply be timed with unexposed regions of the magnetic media 64 to be exposed during later rotations. However, increasing the number of rotations of the magnetic media 64 obviously increases the cumulative time required for the bulk degausser 20 to totally erase the magnetic media 64.

The transport system 22 may be configured for either rotational motion, translational motion or a combination of the two to transport the magnetic media 64 relative to the degaussing window 62. In the configuration shown, the transport system 22 includes a rotating hub 69 (FIG. 3) mounted on a support 70 which includes a pair of opposing rails 71 and 73 (FIGS. 3 and 4). The rails 71 and 73 cooperate with a plurality of rollers 75 to enable translation of the rotating hub 69. The rotating hub 69 provides rotational motion and is sized to receive various magnetic media, such as the tape reel 64, illustrated in FIG. 4. Various adapters are known which cooperate with the rotating hub 69 to accommodate virtually all types of magnetic media 64.

Such adapters are not part of the present invention. The transport motor may be controlled for continuous operation during erasure or for incrementally advancing the magnetic media 64 relative to the degaussing window 62. Such embodiments are within the broad scope of the invention.

When the rotating hub 69 is disposed as illustrated in FIG. 4, the degaussing window 62 overlaps a predetermined diametrical cross-section of the magnetic media 64. As discussed above and illustrated in FIGS. 4 and 5, rotation of the rotating hub 69 causes successive cross-sections of the magnetic media 64 to be exposed to the degaussing window 62. For example, referring to FIG. 5B, the portions 61 were erased when the magnetic media 64 was in the position illustrated in FIG. 5A. Successive portions of the magnetic media 64 are erased as illustrated in FIGS. 5B–5E.

Figure 8:
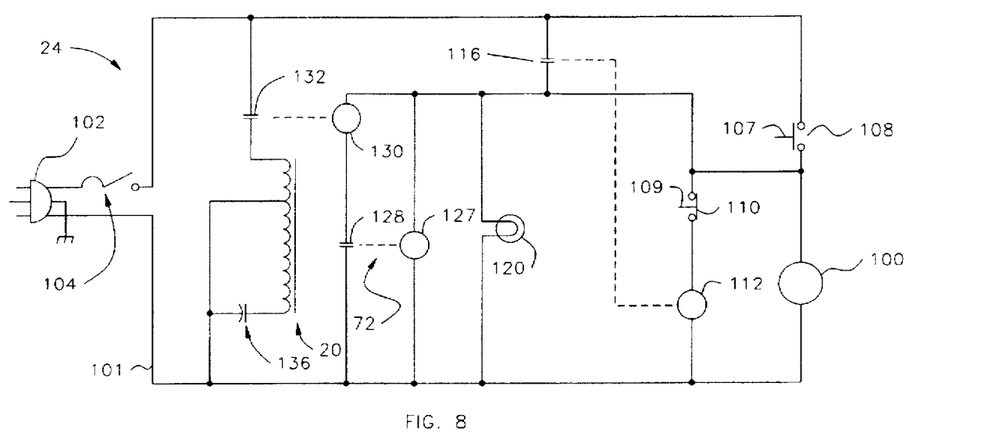
FIG. 8 is an exemplary schematic diagram for a transport system for translating the magnetic media.
Figure 9:
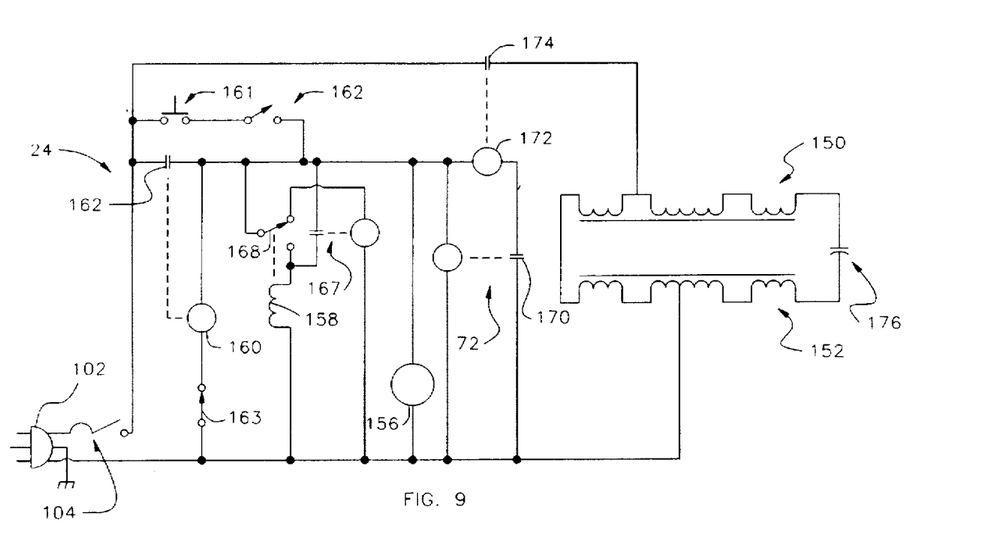
FIG. 9 is an exemplary schematic diagram for a transport system for translating and rotating the magnetic media.

The transport system 22, such as one including a hub 69, rails 71, 73, and rollers 75 (FIGS. 3 and 4), may be driven by motors and gearing arrangement or belts (not shown), to enable rotational motion (either continuously or incrementally) of the magnetic media 64, as best seen in FIG. 5, translational motion (also either continuously or incrementally), or a combination of both rotational motion and translational motion. FIG. 8 illustrates an exemplary embodiment of the invention as a conveyor-type degausser, i.e. translational motion, having a flux source 20 similar in form to that of FIG. 1. FIG. 9 illustrates another exemplary embodiment of the invention as another degausser configuration, in which rotation followed by rotation and translation sweeps the entire media volume through a roughly chord-shaped AC magnetic flux regions instead of a degaussing window 62 of diametrical cross section or one of radial cross section. The embodiments of the invention shown in FIG. 8 and FIG. 9 are discussed in more detail below. All such configurations are within the broad scope of the present invention.

Figure 6A:
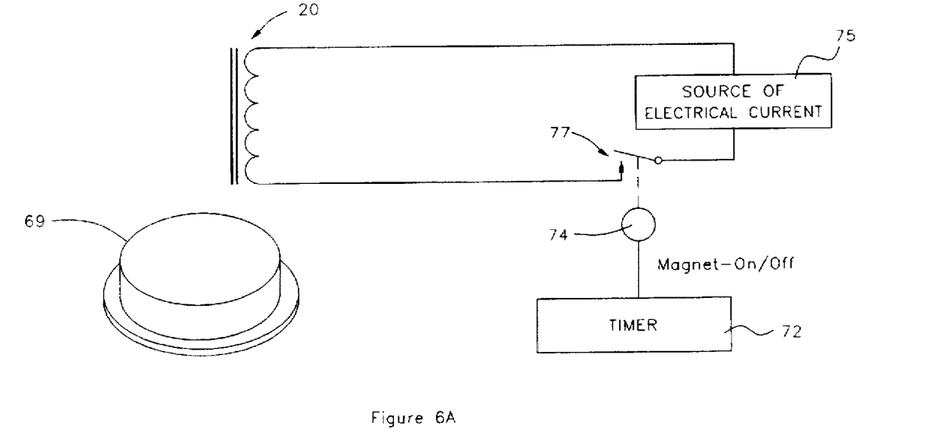
FIGS. 6A and 6B are block diagrams of control systems for the bulk degausser in accordance with the invention.

Various control circuits are contemplated to be within the broad scope of the invention. An exemplary control circuit 24 is illustrated in FIG. 6A. In its simplest form, a timer 72 can be used in conjunction with a relay 74, for example a model No. A1240 as manufactured by the Crydom Company, and associated contacts 77, for example, a recycle time delay relay model No. CRB-48-70010, as manufactured by Potter & Brumfield, to modulate the source of magnetic flux 20. In such a configuration, the transport motor (not shown) is used for rotating the magnetic media 64 at constant revolutions per minute (RPM). The relay 74 and timer 72 are used to modulate a source of electrical current 75 to the electromagnet 20. In particular, the timer 72 is used to control the amount of time that the electromagnet is energized and de-energized. Over the course of a degaussing cycle or portion thereof as determined by switches or sensors, such as limit switches 162 and 163 (FIG. 9), a timer 72 is enabled to successively energize and de-energize the electromagnet 20, by way of a relay 74 having corresponding contacts 77 for preselected modulation period and duty.

The TIME-ON and TIME-OUT periods as well as the RPM of the transport motor (not shown) are selected to expose the entire magnetic media 64 to the degaussing window 62 as discussed above. Alternatively, the system can be controlled such that the rotating hub 69 is stopped during periods when the source of magnetic flux 20 is ON and interleaved with OFF periods in which the transport system 22 incrementally advances the magnetic media 64.

As mentioned above, the system is adapted to accommodate various types of magnetic media, including a full-height magnetic hard drive (FHHD), which includes a plurality of 5¼ inch diameter magnetic disks within a housing having an overall diagonal of about 11 inches as well as magnetic media having smaller form factors.

FHHD's are known to include various rotary and/or linear motors for rotation of the magnetic disks and for positioning of the read/write heads. Such motors are known to include magnets as well as iron laminations, materially similar to the laminated iron cores 38 and 40. As such, when the FHHD is rotated relative to the degaussing window 62, the motor laminations within the FHHD experience attractive forces as the transport system 22 moves the laminations both toward and away from the degaussing window 62. The permanent magnets within the FHHD also experience both magnetic attractive and repulsive forces, depending on the location of the magnets relative to the degaussing window 62. Unfortunately, the attraction and repulsive forces of the laminations and permanent magnets vary with the various models and types of FHHD's. Known FHHD's with relatively massive internal motors are known to stall the rotation of the transport system 22.

In known degaussing systems, the source of magnetic flux 20 is continuous. Thus, once the transport system motor is stalled, the magnetic media 64 is not entirely exposed to the degaussing window 62, which seriously degrades system performance. An important aspect of the present invention is the ability of the bulk degaussing system to automatically recover from stalls of the transport system 22 due to interactions with various magnetic components forming a part of the magnetic media 64, such as the FHHD. By modulating the DC magnetic field, the transport system motor is allowed to automatically recover from a stall during a subsequent TIE-OUT period. However, for bulk degaussers that are adapted to bulk erase magnetic media, such as an FHHD, that are expected to result in relatively strong attraction and repulsion forces to cause stalling of the transport drive motor, a different control system other than the control system described above would be required since the locations of the media segments erased during the subsequent TIME-ON periods would be unpredictable and thus complete erasure of the magnetic media 64 could not be assured.

Figure 6B:
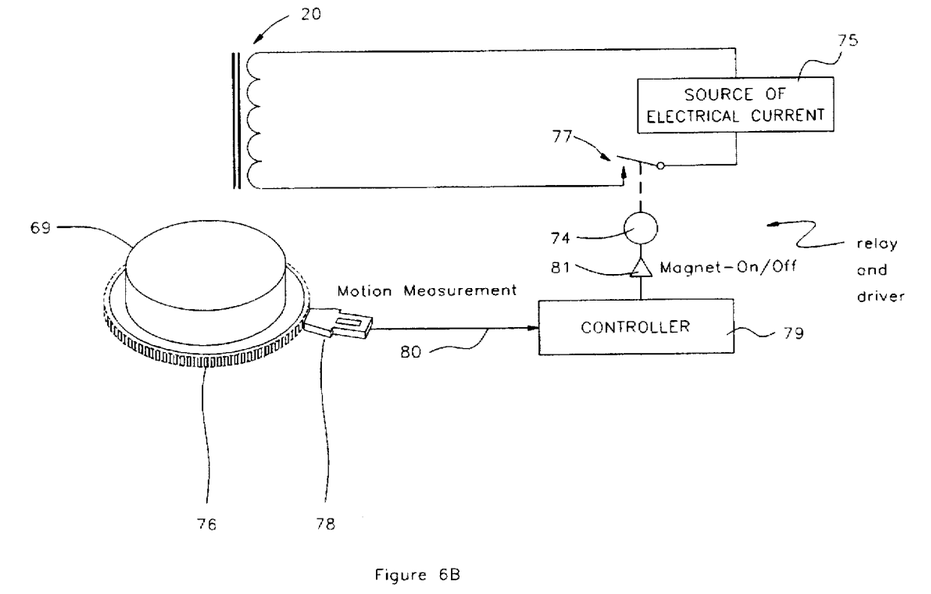

In order to solve such a problem, the control circuit 24 may be adapted to correlate the TIME-ON and TIME-OFF periods with segments of the magnetic media 64. For example, as illustrated in FIG. 6B, the transport system 22 may be provided with a plurality of gear teeth 76, radially spaced relative to the circumference of the rotating hub 69. A gear tooth sensor 78, for example, an optical type sensor such as a spectral reflective optical sensor, configured in a blocking-diffuse arrangement which senses reflection from the bottoms of the gear teeth 76, for example, a model No. OPB700 sensor, as manufactured by Optek Technology, Inc., is used to count gear teeth 76 in order to provide a measure of the angular displacement of the magnetic media 64. The gear tooth sensor 78 generates a pulse 80 (FIG. 7) for each gear tooth 76.

Figure 7:
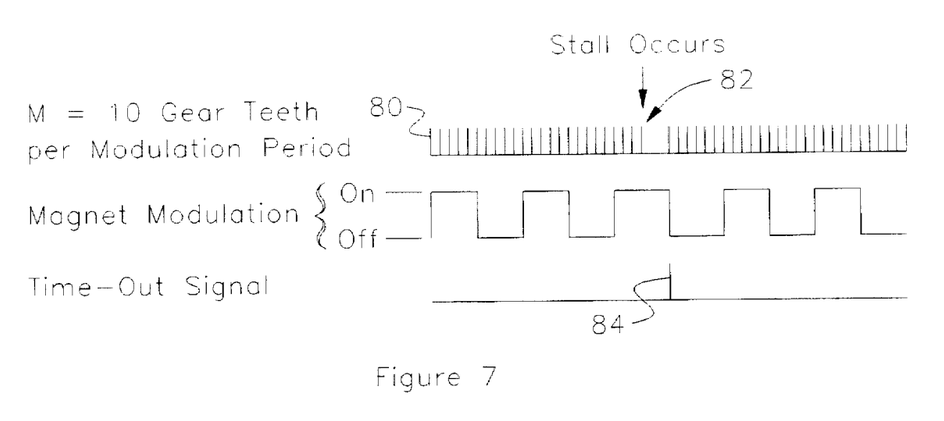
FIG. 7 is a timing diagram for the block diagram illustrated in FIG. 6B.

In such an embodiment, the primary control for controlling the source of magnetic flux 20 is a controller 79. More particularly, the controller 79 for example an 8 bit microcontroller, model No. MC68HC705C8 measures the angular rotation of the transport hub 69 (and thus the magnetic media 64) by counting the pulses 80 from the gear tooth sensor 78. As shown in FIG. 7, a modulation period $M_n$ is based on a predetermined number of pulses from the gear tooth sensor 78. In such an embodiment, the pulses 80 corresponding to each modulation period $M_n$ are counted. For purposes of illustration, ten (10) gear teeth 76 are used for an entire modulation period $M_n$ with the source of magnetic flux 20 being energized for a total of $N_1$ or five (5) gear teeth 76 and turned off for a total of $M-N_1$, or five gear teeth 76.

As shown in FIG. 7, assuming a stall occurs at three pulses into the third modulation period $M_3$, as generally indicated by the arrow 82, an internal timer within the controller 79 will time out at the end of the third modulation period $M_3$, as indicated by the point 84 on the lower horizontal axis. Since only three pulses were counted during the TIME-ON period of the third modulation cycle $M_3$, the system knows the time at which the stall occurred. As such, the controller 79 (FIG. 6B) controls the system such that the source of magnetic flux 20 is modulated OFF for $M-N_3$, or seven (7) pulses 80 (FIG. 7). During such a condition, the output of the controller 79, applied to a driver 81, de-energizes the relay 74, modulating the magnet 20 OFF and thereby removing the cause of the stall. By correlating the modulation $M_n$ periods with specific segments of the magnetic media 64, the stall of the transport system motor will not affect the predictability of the angular location of the magnetic media 64 for subsequent modulation periods.

In certain embodiments where the finite thickness 60 of the degaussing window 62 does not adequately compensate for reduced motion during a stall, it is contemplated to place a lower limit on rotation N measured up to the point of the stall. In a situation where N does not reach that limit, a relatively smaller value could be temporarily substituted for M in order to remove a highly interactive region of the magnetic media 64 from the degaussing window 62 without incurring motion M–N greater than the thickness 60 of the degaussing window 62 during the subsequent magnet OFF period. The subsequent transport action would approximate incremental rotation during magnet OFF periods interleaved with magnet ON periods until the highly interactive region of the media 64 were sufficiently removed from the degaussing window 62 and fringing flux (not shown) around it.

Figure 10A:
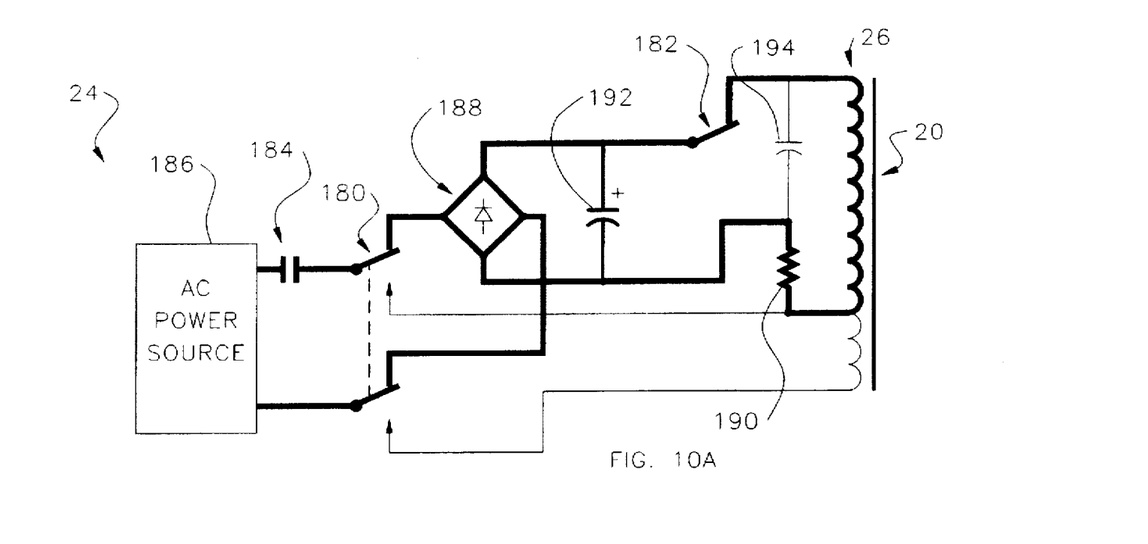
FIGS. 10A and 10B are simplified schematic diagrams of a system in accordance with the present invention for applying both unmodulated and modulated sources of electrical power to the magnet; shown in a DC mode and an AC mode, respectively.
Figure 10B:
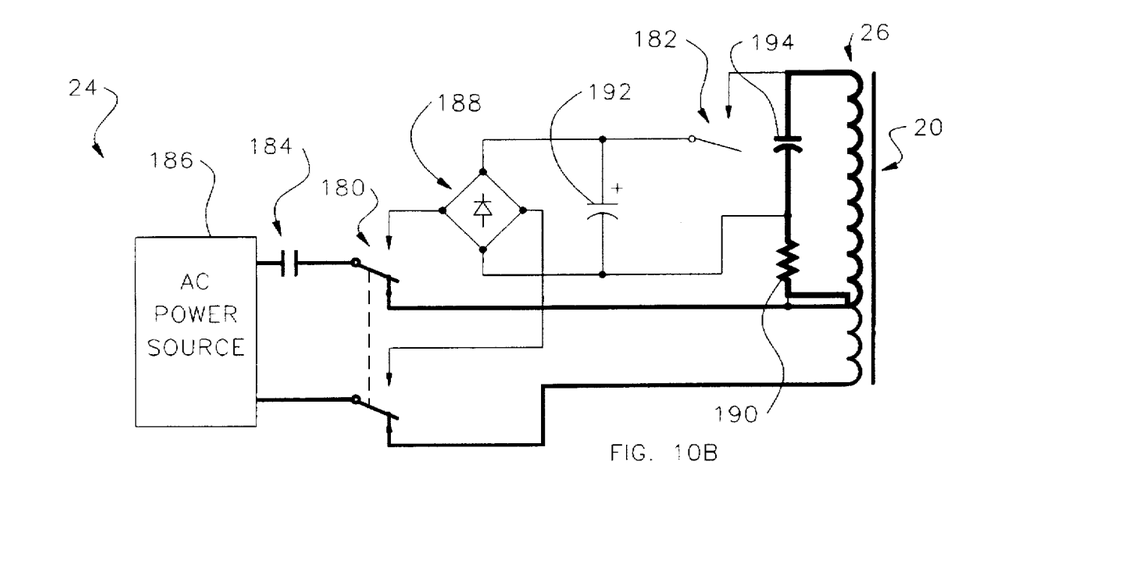

In the embodiment of the invention as discussed above, the source of magnetic flux 20 may be modulated with a DC current. However, it is also contemplated that the source of magnetic flux 20 can be modulated with a DC current for a predetermined interval, for example, followed by a modulated or unmodulated AC current. Alternatively, the source of magnetic flux 20 can be energized continuously by an unmodulated source of DC electrical current for a predetermined interval, for example, followed by a modulated source of AC electrical current as illustrated in FIGS. 10A and 10B and discussed below. As will be appreciated by those of ordinary skill in the art, generation of the maximum magnetic field strength using a DC current voids induction of large eddy currents in any massive aluminum part in the FHHD housing that would occur from AC exposure to the same magnetic strength.

Exemplary schematic diagrams for modulated field degaussing systems are illustrated in FIGS. 8 and 9, which show circuitry adapted to the general method illustrated in FIG. 6A. In particular, FIG. 8 is a schematic diagram incorporating the invention into a degaussing system which utilizes translation only, for example, by way of an endless belt, to transport magnetic media 64 with respect to an AC flux degaussing window 62. Examples of translation-only degaussers to which the invention could be applied include the TC-14 model, as manufactured by Data Security, Inc., and the model 1400, as manufactured by Garner Industries, Inc., both of which employ a magnet 20 configuration similar to that shown in FIG. 1. FIG. 9 illustrates another exemplary schematic diagram adapted to the invention, in which a transport system 22 enables rotation as well as translation to sweep the entire volume of magnetic media 64 relative to a roughly chord-shaped AC degaussing window. Examples of such systems to which the invention could be adapted include the Type I model, as manufactured by Data Security, Inc.; model No. KV-90, as manufactured by General Kinetics, Inc.; and model No. TD2903-4B, as manufactured by Bell & Howell Corp.

Referring to FIG. 8, a drive motor 100 is used to drive an endless belt (not shown) to translate the magnetic media 64 relative to the degaussing window 62. The drive motor and control circuitry described below are connected across a source of alternating current (AC) electrical power, for example, by way of plug 102 and circuit breaker 104. A pair of start and stop pushbuttons 107 and 109, respectively, with single-pole single-throw contacts 108 and 110 are used to start and stop the degaussing system as follows. The contact 108 is a normally open momentary contact while the contact 110 is a normally closed momentary contact. Initially, as illustrated in FIG. 8, the degaussing system is in idle condition. Once the start pushbutton 107 is depressed, the drive motor 100 is connected across the source of AC electrical power through normally open momentary contact 108. Depressing start pushbutton 108 also energizes relay coil 112 through normally closed momentary contact 110, closing corresponding relay contact 116. Once relay contact 116 closes, the corresponding relay coil 112 remains energized through the relay contacts 116 and the normally closed momentary switch contacts 110 until such time as the stop pushbutton 109 is depressed. Opening of the switch contacts 110 by way of the pushbutton 109 interrupts the source of electrical energy to relay coil 112, thus opening the corresponding relay contacts 116 and de-energizing the drive motor 100. Such relay latching operation is common to the art of controlling such degaussers.

The latching action of the relay contacts 116 may also be used to energize an erase indicator 120, as well as the magnet 20 through a solid-state relay input 130 and associated output 132, which are widely known to accommodate surge currents associated with initial energization of magnet 20 and its associated resonant capacitance 136. In order to implement the invention, the contacts 116 may also enable the input 127 of the cyclic timer 72. The output contacts 128 of the cyclic timer 72, interposed between the relay coil 74 and the return path 101 to the AC power source, modulate the magnet 20.

Whenever the relay contacts 116 are closed, the cyclic timer 72 input 127 is directly energized. During such time, the cyclic timer output contacts 128, in turn, modulate the relay coil 74, closing contacts 78, and thereby modulating magnet 20, which operates with capacitance 136 for power factor correction and resonant energy storage. Meanwhile, the drive motor 100 operates continuously to transport magnetic media through the degaussing window 62. If the modulation OFF time corresponds to media translation equivalent to the effective window thickness 60, the modulation ON time can be made very short, limited in practice to a few half cycles of AC power needed to charge the magnet 20 and its associated capacitance 136 in the face of surge-induced line voltage drop. Therefore, the magnet-operating duty can be reduced much below the conventional continuous operation for such degaussing systems, saving energy and reducing magnet heating, without affecting the belt speed or by implication the time required to erase the magnetic media.

Additional advantages arise for well-known induction of AC eddy currents by such conveyor belt translational degaussing systems, notably when magnetic media on aluminum-flanged reels are translated through the degaussing window. The reduced magnet duty will correspondingly reduce objectionable eddy-current heating of the reel flanges. Eddy currents also generate repulsive forces in the aluminum flanges, and in extreme cases are known to counteract the forces of gravity and magnetic attraction acting on the magnetic media, directing it toward the horizontal center plane 50 and subsequently levitating it off of the belt, which interferes with the intended translation. Modulation provides periods free of such levitating forces, allowing the belt to extract the media from the degaussing window in such cases.

FIG. 9 illustrates another exemplary embodiment of the invention in which the transport system 22 is used for both translation and rotation of the magnetic media 64. In this embodiment, the source of magnetic flux 20 may be formed from two cores of stacked "E" laminations, forming an upper flux source 150 and a lower flux source 152 so disposed with legs of each core facing each other across an intervening gap sized for the magnetic media thickness. A series of coils wound around the legs of the "E" cores are conventionally fitted with connections between each other and with taps, permitting adaptation to different AC electrical power sources and media thickness adjustment. A capacitance 176, connected between coils of each core, provides resonant energy storage and power factor correction. The opposition of the core poles and the coil current phasing produces two magnetic fields between the center legs of the "E" cores and each pair of upper and lower outer core legs, each field having characteristics very similar to those described for FIG. 2 and plotted in FIG. 3. However, this art is normally practiced with short core stacks placed such that the degaussing window 62 does not span a diametrical portion of the magnetic media 64 as shown in FIG. 4, but rather spans a roughly chord-shaped region of the magnetic media. While the flux source is conveniently constructed from unmodified laminations commercially available for transformer cores, the two regions of magnetic flux that results from their application to bulk degaussing is often viewed as a wasteful practice.

The circuit of FIG. 9 is shown de-energized as occurs between erasing cycles and with the translational mechanism of the transport 22 intermediate between a fully inward (IN) and a fully outward (OUT) position, as defined by the state of normally open limit switch 162 and normally closed limit switch 163, respectively. In that condition, a clutch mechanism (not shown), activated by a solenoid 158, is disengaged to permit manual positioning of the transport between OUT and IN positions. When positioned IN, the transport closes the limit switch 162, enabling the start of an erase cycle when the normally open momentary pushbutton 161 is depressed. Similar to the latching operation described for FIG. 8, the relay coil 160 is then energized to close its corresponding contacts 162, activating the remainder of the circuitry for the remainder of the erase cycle, until the transport translation opens the OUT limit switch 163 at the end of the cycle.

With relay contacts 162 latched closed, the drive motor 156 initially provides rotation alone for a predetermined interval required for a time delay relay 167 to energize the clutch solenoid 158. In addition to activating the dual role of translation and rotation of the drive motor 156, the clutch solenoid 158 changes the position of the limit switch 168 from the position shown to its alternate position, which allows the time delay relay 167 to reset and latch the clutch solenoid 158 until the OUT limit switch 163 senses an end-of-cycle condition.

Also, similar to FIG. 8, the closing of the relay contacts 162 energizes the input of the cyclic timer 72 throughout the erase cycle, modulating the relay coil 172 and corresponding contacts 174, which, in turn, modulates AC electrical power from the plug 102 to the windings around upper and lower flux sources 150 and 152, respectively, which cooperate with capacitance 176 for resonant energy storage and power factor correction.

The embodiments illustrated in FIGS. 8 and 9 illustrate exemplary control systems for modulating AC power to a magnetic flux source 20 using relays and cyclic timers as anticipated in FIG. 6A. Motion measurement control as illustrated in FIG. 6B is equally applicable to a variety of bulk degaussing practices in addition to the rotation case shown in FIG. 5. More specifically, two roughly equivalent flux regions generated between the center "E" legs and each pair of outer legs of upper and lower flux sources 150 and 152 suggest alternating shorter and longer modulation periods. The shorter periods allow for magnetic media motion equal to ½ times the distance between flux regions, while the longer periods allow for motion equal to 1½ times that distance, thereby preventing exposure of any point in the media to the two roughly equivalent flux regions and improving energy efficiency. Moreover, translation increasing the radial distance between the rotation hub 69 and a roughly chord-shaped degaussing window generated by flux sources 150 and 152, along with constant angular velocity of rotation, increases the relative velocity between the degaussing window and the magnetic media 64 in proportion to the accumulated translation. While the control anticipated in FIG. 6A requires inefficient adjustment of modulation parameters to the fastest velocity between degaussing window and magnetic media, the control anticipated in FIG. 6B can compensate for accumulated translation by shortening the modulation periods in inverse proportion to the hub to window distance, offering additional energy savings potential.

All of the preceding implementations are considered to be within the broad scope of the invention. Moreover, the invention can be applied to degausser systems having multiple sources of DC and AC magnetic flux, with either the DC sources or the AC sources or both modulated, or to degausser systems having a single flux source sequentially energized with DC electrical power and with AC electrical power, again either or both of which may be modulated.

FIGS. 10A and 10B illustrate a simplified circuit for energizing a single magnetic flux source with a sequence of DC and AC electrical power. FIG. 10A illustrates the state of the circuit in the DC mode while FIG. 10B illustrates the state of the circuit while in the AC mode. Variable line weights illustrate the electrical current paths in each of these modes. As in FIG. 6B, relay coils, drivers, sensors and a microprocessor (not shown), establish the positions indicated for double-pole double-throw relay contacts 180 and high-voltage normally closed relay contacts 182, as well as the motion measurements and the modulation parameters for solid-state relay output 184.

Referring to the heavy line weights shown in FIG. 10A, AC line current from an AC source of electrical power 186 is applied through normally closed contacts of a relay 180 to a bridge rectifier 188, which converts the AC electrical current to DC electrical current. The output of the bridge rectifier 188 is applied, in turn, to the magnet winding 26 by way of a normally closed relay contact 182 and returns to bridge rectifier 188 by way of a shunt resistor 190. A capacitance 192 may be connected across the output of the bridge rectifier, charging to near the peak of the AC line voltage and thereby increasing the current through highly inductive winding 26. The intermediate line weight indicates the charging current through that capacitance.

As indicated in FIG. 10A, DC current may be applied to only a portion of the winding 26, such as 1235 turns out of 1277 turns in the example previously given for AC operation. Thus, if the capacitance 192 is sized to retain a charge near the 294 Volt peak of a commercial 208 Volt AC power source, the current through the previously cited 10 Ohm resistance can approach 29 Amperes, and the magnetic potential through the winding can approach 36,000 Ampere turns, which generates substantially greater magnetic strength (flux density from flux source 20) than the 12,250 Ampere turn magnetic potential previously cited for the same magnet construction details operating in the AC mode described below. The results are much greater magnetic strength and erasing effectiveness for a given magnet and degaussing system than if the magnet were operated only at a practical AC operating point, high levels of power dissipation (magnet heating) if the magnet is operated in a continuous DC mode, and much greater interaction between the degaussing window and strongly magnetic components of certain magnetic media, which requires either massive transport components to prevent stalls or modulation of the DC operation to allow recovery from transport stalls.

FIG. 10B represents an AC mode of operation. In this mode, flux source 20 operates in the manner of an autotransformer to step-up the line voltage to a much higher voltage across the capacitance 194, sized to resonate with the inductance of the flux source at the frequency of the AC power source. The relay contacts 180 are switched as shown to isolate the input of bridge rectifier 188 and to apply AC electrical power to the turns of the winding 26 as indicated by the intermediate line weight. Also, the relay contacts 182 are opened to block the high voltage induced across capacitance 194 from appearing across the DC excitation circuit. The heavy line weight indicates the effective AC magnetizing current through most of the winding turns, shunt resistor 190, and the capacitance 194. Benefits of AC modulation include reducing magnet heating, saving energy, and especially reducing eddy currents in certain massive conductive carriers of magnetic media, such as aluminum reels and disk drive cases.

The effective DC and AC magnetizing currents of both FIG. 10A and FIG. 10B, respectively, both flow through the same shunt resistor 190, which represents a common circuit point to monitor both DC and AC modes for process verification purposes. The shunt resistor or some other current measuring means are not essential to the basic operation of the circuit. Also, different current monitoring means could be installed at a single point or at different points of a circuit. Of course, the highly reactive circuits cannot respond instantly to electrical power applied when relay 184 modulates ON. It is anticipated that the voltage across resistor 190 can also serve as feedback for regulating functions. For example, the voltage rises while current builds up in inductive windings 26 after each modulation ON period can reach a predetermined minimum effective DC operating strength, which, in turn, can signal an acceptable modulation OFF time in cases where the motion constraints of the modulation ON interval have also been satisfied. Furthermore, the current signals across shunt resistor 190 enable protective functions where it is desired to prevent switching of relays 180 and 182 while reactive energy dissipates after relay 184 turns OFF.

In the DC and/or the AC modes, the relay contacts 184 may be modulated to achieve the benefits described above, or it may be unmodulated during either of the modes, depending on the particulars of a deguassing system and the media it is intended to degauss. These relay contacts are typically in the form of a solid-state relay output in order to accommodate the current surges required to initially charge capacitances 192 and 194. Alternatively, individual relays could be located in the circuit to modulate DC and AC modes in any sequence. In an embodiment with multiple flux sources 20, individual sources may be operated continuously and/or be modulated, in any combination or sequence.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A bulk degaussing system for bulk erasing various predetermined magnetic media, the system comprising:

means for generating magnetic flux with a predetermined field strength in a predetermined volume defining a degaussing window;

means for transporting a portion of said magnetic media relative to said degaussing window; and means for enabling automatic recovery of said transporting means from stalls due to magnetic interaction between the magnetic media and said generating mean by de-energizing said generating means during predetermined intervals.

2. A bulk degaussing system as recited in claim 1, wherein said enabling means includes means for modulating said generating means.

* * * * *